United States Patent [19]

Stack, Jr. et al.

[11] Patent Number: 5,265,900

[45] Date of Patent: Nov. 30, 1993

[54] SLIDING FIFTH WHEEL RACK STOP BLOCK

[76] Inventors: Robert L. Stack, Jr.; Daniel L. Riddles; William W. Riddles, all of 405 W. Nevada, Walters, Okla. 73572

[21] Appl. No.: 963,188

[22] Filed: Oct. 19, 1992

[51] Int. Cl.$^5$ ............................................. B62D 53/08
[52] U.S. Cl. ............................................. 280/438.1
[58] Field of Search ............... 280/438.1, 433, 432, 280/441, 441.2

[56] References Cited

U.S. PATENT DOCUMENTS

| | | | |
|---|---|---|---|
| 2,138,679 | 11/1938 | Sherman | 280/438.1 |
| 2,807,477 | 9/1957 | Tuso, Jr. | 280/438.1 |
| 4,443,025 | 4/1984 | Martin et al. | 280/438.1 |

*Primary Examiner*—Mitchell J. Hill
*Attorney, Agent, or Firm*—Robert K. Rhea

[57] ABSTRACT

Stop blocks are mounted on racks supporting a sliding fifth wheel assembly on a truck/tractor for stopping forward or rearward adjusting movement of the fifth wheel relative to the racks at a selected position for distributing weight between the forward and rearward axles of the truck/tractor.

The stop blocks each contain a pawl vertically biased downwardly by a spring for engagement with notches between adjacent teeth of the sliding fifth wheel racks. The pawl is moved vertically by a lever projecting out of the respective stop block for moving the block to a selected position longitudinally of the rack.

6 Claims, 1 Drawing Sheet

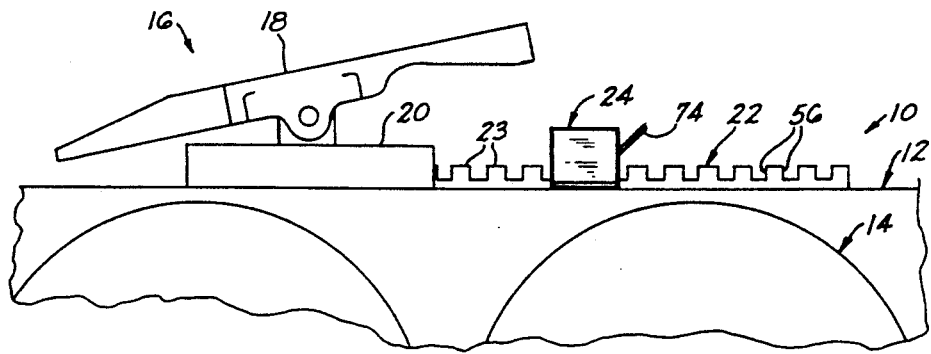
FIG. 1
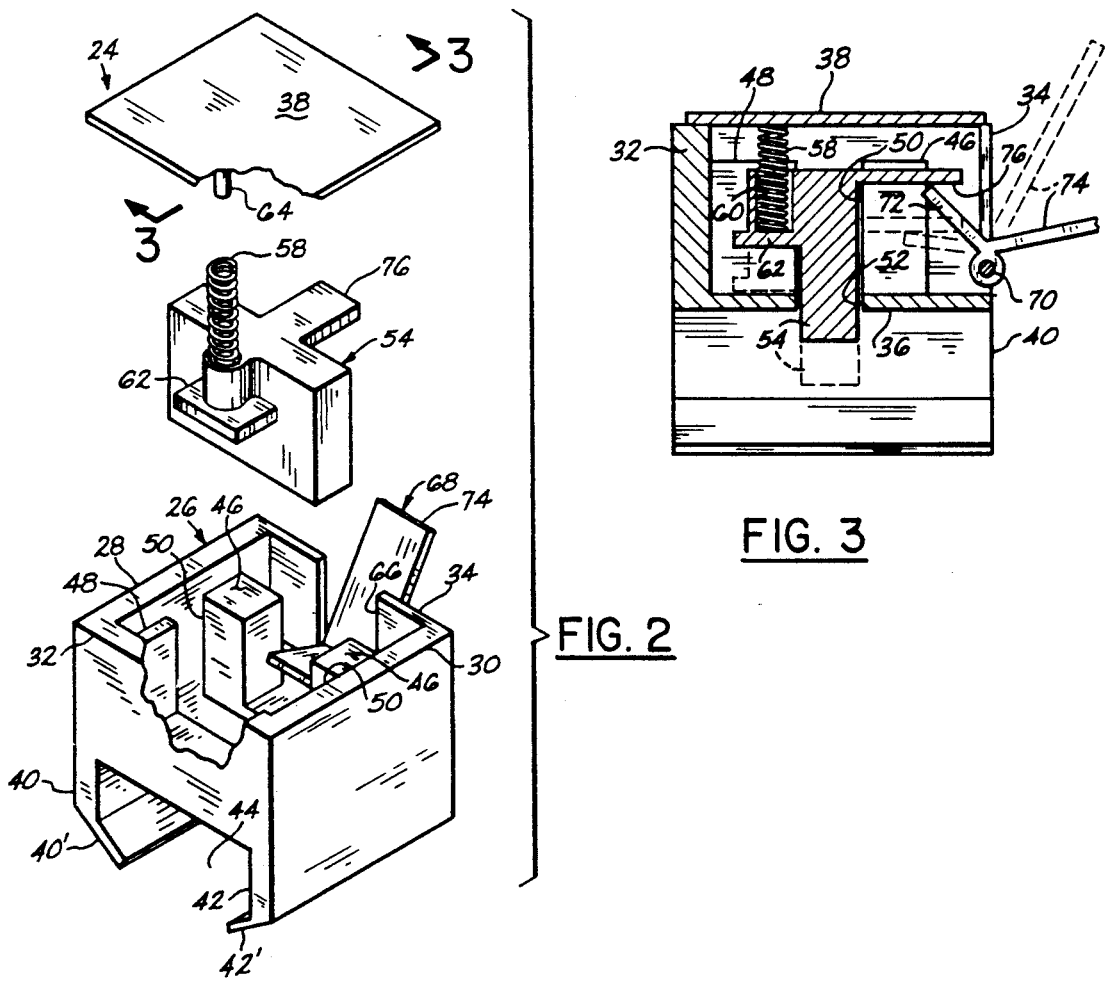
FIG. 2
FIG. 3

SLIDING FIFTH WHEEL RACK STOP BLOCK

BACKGROUND OF THE INVENTION

1. Field of the Invention

Over-the-road, truck/tractor rigs of the eighteen wheel type are usually provided with a bracket assembly, commonly known as a "fifth wheel", mounted on the frame of the truck/tractor over the position of the dual wheel axle for supporting the forward end portion of the trailer.

The fifth wheel is supported by parallel racks for movement of the fifth wheel forward to rearward with respect to the position of the dual drive wheel axle for distributing the loaded trailer mass between the drive axle and the steering axle of the truck/tractor.

Air pressure operated detents in the fifth wheel unit engage the teeth of the racks to hold the fifth wheel against movement relative to the racks longitudinally of the truck/tractor. The spaces between the teeth of the racks are commonly referred to as "notches" and these notches are used as a reference in determining the distance the fifth wheel is to be moved forward or rearward to distribute the trailer mass between the truck/tractor axles.

For example, in one popular fifth wheel assembly, moving the fifth wheel one notch forwardly adds an additional 350 pounds (770 kilograms) to the front axle of the truck/tractor. The fifth wheel position relative to the racks is normally adjusted by locking the trailer rear wheel brakes, and moving the truck/tractor forward or backward in accordance with a desired position for the fifth wheel on the racks.

When the trailer is fully loaded, this is not easily accomplished and requires the driver getting in and out of the cab to check the position of the fifth wheel relative to the racks each time he has moved the truck/tractor relative to the trailer.

This invention solves the inconvenience of the driver not being able to easily and accurately move the fifth wheel to a desired position by providing a stop block for limiting movement of the fifth wheel.

2. Description of the Prior Art

As mentioned hereinabove, it is very difficult for a driver to stop a sliding fifth wheel at a desired notch along its racks.

Some drivers have used large bolts, long round bars, and even wrenches which sometimes lodge in and damage the racks in an attempt to stop the sliding fifth wheel at a desired notch. Such impromptu attempts have generally been unsatisfactory.

For example, the rod may bend and wedge between the rack and the fifth wheel unit and, in some cases, the trailer has been crashed into the sleeper compartment of the truck/tractor.

We do not know of any prior patents which discloses a stop block such as is disclosed by this invention.

SUMMARY OF THE INVENTION

An upwardly open box-like block having its top normally closed by a lid is provided with a pair of depending legs forming a downwardly open slot which straddles a truck/tractor fifth wheel rack for sliding movement of the block longitudinally of the rack and preventing upward movement of the block relative to the rack.

The block bottom wall is transversely apertured for vertical movement of the depending end portion of a pawl, normally gravity and spring biased downwardly for engaging the teeth of the fifth wheel rack. Guides on the inner side walls of the block form a slot in which the pawl is vertically moveable.

An arm on the top projects horizontally toward one end wall and is manually moved upwardly by one end portion of a lever, pivotly mounted on the block end wall, by downward movement of the other end portion of the lever which projects outwardly of the block end wall. With the pawl raised the block may be manually moved longitudinally of the respective fifth wheel rack and re-engaged with a selected notch.

The principal object of this invention is to provide an easily used stop block which will position a truck/tractor sliding fifth wheel at a selected position on its supporting racks.

BRIEF DESCRIPTION OF THE DRAWINGS

FIG. 1 is a fragmentary side elevational view of a truck/tractor sliding fifth wheel assembly with one of the stop blocks positioned on one rack;

FIG. 2 is an exploded perspective view of the stop block with portions broken away for clarity; and, FIG. 3 is a vertical cross sectional view taken substantially along the line 3—3 of FIG. 2 when the components are assembled.

DESCRIPTION OF THE PREFERRED EMBODIMENTS

Like characters of reference designate like parts in those figures of the drawings in which they occur.

In the drawings:

The reference numeral 10 indicates the rearward end portion of a truck/tractor having a frame 12 supported by dual driving wheels 14 mounted on an axle, not shown.

The numeral 16 indicates a fifth wheel assembly comprising a fifth wheel 18 supported by its mount 20 for sliding movement longitudinally along pair of racks 22, only one being shown. The fifth wheel mount 20 contains air pressure operated detents engageable with the teeth 23 of the rack 22 for locking the fifth wheel 18 against longitudinal movement relative to the racks 22.

The numeral 24 indicates the stop block, as a whole, comprising a rectangular upwardly open box frame 26 defined by side walls 28 and 30, a rearward wall 32, and a forward wall 34 joined by a bottom wall 36. A top wall 38 normally overlies the box frame 26 and is rigidly secured thereto, after assembly of its components, as presently described.

A pair of integral legs 40 and 42 depend from the respective sides of the box frame 26 and are transversely reduced in thickness at their depending end portions, as at 40' an 42', and are turned inwardly to define a slot 44 loosely receiving the rack 22 in longitudinal sliding relation.

Forward and rearward pairs of lugs 46 and 48, only one of the later being shown, are rigidly secured to the inner wall surface of the side walls 28 and 30 in forward to rearward spaced-apart relation to define a pair of confronting slots 50 therebetween, the bottom wall 36 being provided with a cooperating vertical slot 52 for freely receiving, in cooperation with the lug slots 50, a pawl 54.

The forward to rearward thickness dimension of the pawl 54 is such that it is freely received by anyone of the notches 56 between any two adjacent teeth 23 of the respective rack 22.

The pawl 54 is normally biased downwardly by a spring 58 nested at its depending end in a socket 60 formed in the upper rearward portion of the pawl 54 above a rearwardly projecting lip 62. The top end portion of the spring surrounds and is guided by a rod 64 rigidly connected with and depending from the lid 38.

The box frame forward wall 34 is vertically slotted as at 66 for pivotally supporting a lever 68 intermediate its ends for vertical pivoting movement of its respective end portions about a horizontal axis. The end portion 72 of the lever projects into the box frame toward the pawl 54 while the other end portion 74 of the lever projects forwardly of the box frame front wall 34. Manual downward movement of the outer lever end portion 74 moves the lever end portion 72 upward against a lever arm 76 projecting horizontally forward from the upper limit of the pawl to raise the later against gravity and the force of the spring 58 which disposes the depending end of the pawl above a horizontal plane defined by the upper limit of the rack teeth 23.

Operation

In operation, a pair of the stop blocks 24 are mounted on the fifth wheel racks 22. When it is desired to adjust the position of the fifth wheel 18 the lever 74 of the respective stop block is manually forced downwardly to lift the pawl and manually move the block longitudinally of the rack to permit the pawl 54 to engage a selected companion notch 56 on the respective rack 22. The driver then moves the truck/tractor relative to its trailer in a predetermined direction, either forward or rearward, until the fifth wheel support 20 engages the pair of stop blocks.

Obviously the invention is susceptible to changes or alterations without defeating its practicability. Therefore, we do not wish to be confined to the preferred embodiment shown in the drawings and described herein.

We claim:

1. In a truck/tractor having a frame supporting a fifth wheel on racks having upstanding spaced-apart teeth for longitudinal fore and aft movement of the fifth wheel relative to the racks and frame, the improvement comprising:

box frame means including a bottom wall overlying and longitudinally slidably supported by the fifth wheel racks;

pawl means including a rack engaging pawl supported by said box frame means for normally precluding movement of said box frame means relative to the racks; and, means including legs depending from said box frame means for straddling said racks and preventing vertical movement of the box frame means relative to said racks.

2. The combination according to claim 1 in which said box frame includes spaced-apart side walls joined by said bottom wall, said bottom wall having a transverse vertical opening, said side walls each having a vertical slot disposed in cooperative alignment with the bottom wall opening and in confronting relation with the slot in the opposite wall, said pawl being slidably guided by the wall slots for vertical movement through the bottom wall opening.

3. The combination according to claim 2 and further including:

resilient means biasing said pawl toward said rack teeth.

4. The combination according to claim 2 and further including:

means including a lever for moving said pawl vertically relative to wall.

5. The combination according to claim 4 in which the lever means comprises:

a lever pivotally supported by said box frame for vertical pivoting movement of its respective end portions about a horizontal axis and having one end portion projecting into said box frame for lifting said pawl in response to downward movement of the other end portion of said lever.

6. The combination according to claim 3 in which the resilient means includes:

a top wall extending between the side walls; and, a spring interposed between the top wall and said pawl.

* * * * *